(12) United States Patent
Althaus et al.

(10) Patent No.: US 10,442,113 B2
(45) Date of Patent: Oct. 15, 2019

(54) METHOD AND DEVICE FOR TREATING VISCOUS, PASTE-LIKE MATERIALS

(71) Applicant: LIST HOLDING AG, Arisdorf (CH)

(72) Inventors: Martin Althaus, Oberdorf (CH); Roger Hafner, Hartheim (DE); Daniel Witte, Grenzach-Wyhlen (DE); Karsten Güdemann, Kandern (DE)

(73) Assignee: List Technology AG, Arisdorf (CH)

( * ) Notice: Subject to any disclaimer, the term of this patent is extended or adjusted under 35 U.S.C. 154(b) by 918 days.

(21) Appl. No.: 14/771,333

(22) PCT Filed: Mar. 3, 2014

(86) PCT No.: PCT/EP2014/054058
§ 371 (c)(1),
(2) Date: Dec. 21, 2015

(87) PCT Pub. No.: WO2014/135489
PCT Pub. Date: Sep. 12, 2014

(65) Prior Publication Data
US 2016/0107336 A1    Apr. 21, 2016

(30) Foreign Application Priority Data
Mar. 4, 2013   (DE) .................. 10 2013 102 099

(51) Int. Cl.
*B29B 7/00*     (2006.01)
*B01F 7/00*     (2006.01)
*B01F 15/00*    (2006.01)
*B29B 7/72*     (2006.01)
*B01F 7/04*     (2006.01)
(Continued)

(52) U.S. Cl.
CPC ............... *B29B 7/726* (2013.01); *B01F 3/10* (2013.01); *B01F 7/042* (2013.01); *B01F 7/048* (2013.01); *B01F 13/045* (2013.01); *B01F 15/00136* (2013.01); *B01F 15/00175* (2013.01);
(Continued)

(58) Field of Classification Search
CPC ......... B29B 7/286; B29B 7/726; B29B 7/722; B29B 7/44; B29B 7/481; B01F 15/00136; B01F 13/045; B01F 3/10; B01F 7/042; B01F 7/048; B01F 15/00175
See application file for complete search history.

(56) References Cited

U.S. PATENT DOCUMENTS 3,687,422 A   8/1972   List
4,361,081 A   11/1982  Howard
(Continued)

FOREIGN PATENT DOCUMENTS

CH     506322 A    4/1971
DE   3502437 A1    7/1986
(Continued)

OTHER PUBLICATIONS

International Search Report for PCT/EP2014/054058 dated Jun. 4, 2014.
(Continued)

*Primary Examiner* — Anshu Bhatia
(74) *Attorney, Agent, or Firm* — Bachman & LaPointe, PC

(57) ABSTRACT

A method for treating in particular viscous, paste-like materials in a housing (1) with kneading elements (2, 3), in which at least one kneading element (2, 3) is to be monitored.

4 Claims, 2 Drawing Sheets

(51) Int. Cl.
  *B01F 13/04* (2006.01)
  *B01F 3/10* (2006.01)
  *B29B 7/44* (2006.01)
  *B29B 7/48* (2006.01)
  *B29B 7/28* (2006.01)

(52) U.S. Cl.
  CPC .............. *B29B 7/286* (2013.01); *B29B 7/44* (2013.01); *B29B 7/481* (2013.01); *B29B 7/722* (2013.01)

(56) References Cited

U.S. PATENT DOCUMENTS

| | | | |
|---|---|---|---|
| 4,504,150 A | | 3/1985 | De Vries |
| 4,508,454 A | * | 4/1985 | Anders .................. B29O 47/38 366/80 |
| 5,147,135 A | | 9/1992 | List et al. |
| 5,407,266 A | | 4/1995 | Dötsch et al. |

FOREIGN PATENT DOCUMENTS

| | | |
|---|---|---|
| DE | 4303852 A1 | 8/1994 |
| DE | 19940521 A1 | 4/2001 |
| DE | 10160535 A1 | 6/2003 |
| EP | 0451747 A1 | 10/1991 |
| EP | 0517068 A1 | 12/1992 |
| WO | 2014023738 A2 | 2/2014 |

OTHER PUBLICATIONS

Corrected International preliminary report on patentability for International application No. PCT/EP2014/054058 dated Feb. 16, 2015.

* cited by examiner

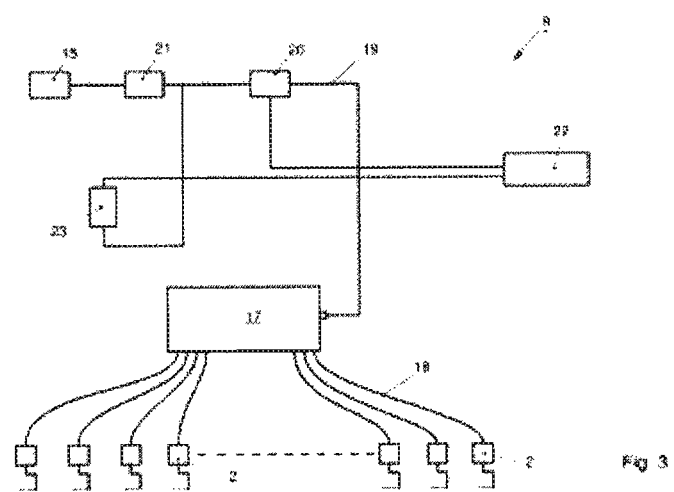

METHOD AND DEVICE FOR TREATING VISCOUS, PASTE-LIKE MATERIALS

BACKGROUND OF THE INVENTION

The invention relates to a method for treating in particular viscous-pasty compositions in a housing with kneading elements, at least one kneading element being monitored.

Such devices are also referred to as mixing kneaders. They serve for a wide variety of different purposes. To be mentioned first is evaporation with solvent recovery, which is performed batchwise or continuously and often also under a vacuum. This is used for example for treating distillation residues and in particular toluene diisocyanates, but also production residues with toxic or high-boiling solvents from the chemical industry and pharmaceutical production, wash solutions and paint slurries, polymer solutions, elastomer solutions from solvent polymerization, adhesives and sealing compositions.

The apparatuses are also used for carrying out continuous or batchwise contact drying of products that are moist with water and/or solvents, often likewise under a vacuum. Intended applications are especially for pigments, dyes, fine chemicals, additives, such as salts, oxides, hydroxides, antioxidants, temperature-sensitive pharmaceutical and vitamin products, active substances, polymers, synthetic rubbers, polymer suspensions, latex, hydrogels, waxes, pesticides and residues from chemical or pharmaceutical production, such as salts, catalysts, slags and waste liquors. Other applications for these methods are in food production, for example the production and/or treatment of block milk, sugar substitutes, starch derivatives, alginates, for the treatment of industrial slurries, oil slurries, bio slurries, paper slurries, paint slurries and generally for the treatment of tacky, crust-forming viscous-pasty products, waste products and cellulose derivatives.

In mixing kneaders, degassing and/or devolatilization can take place. This is applied to polymer melts, after condensation of polyester or polyamide melts, to spinning solutions for synthetic fibers and to polymer or elastomer granules or powder in the solid state.

In a mixing kneader, a polycondensation reaction can take place, usually continuously and usually in the melt, and is used especially in the treatment of polyamides, polyesters, polyacetates, polyimides, thermoplastics, elastomers, silicones, urea resins, phenolic resins, detergents and fertilizers.

A polymerization reaction can also take place, likewise usually continuously. This is applied to polyacrylates, hydrogels, polyols, thermoplastic polymers, elastomers, syndiotactic polystyrene and polyacrylamides.

Quite generally, solid, liquid and multi-phase reactions can take place in the mixing kneader. This applies especially to back-reactions, in the treatment of hydrofluoric acid, stearates, cyanates, polyphosphates, cyanuric acids, cellulose derivatives, cellulose esters, cellulose ethers, polyacetal resins, sulfanilic acids, Cu-phthalocyanines, starch derivatives, ammonium polyphosphates, sulfonates, pesticides and fertilizers.

Furthermore, solid/gas reactions (for example carboxylation) or liquid/gas reactions can take place. This is applied in the treatment of acetates, azides, Kolbe-Schmitt reactions, for example BON, Na-salicylates, parahydroxybenzoates and pharmaceutical products.

Liquid/liquid reactions take place in the case of neutralization reactions and transesterification reactions.

Dissolution and/or degassing takes place in such mixing kneaders in the case of spinning solutions for synthetic fibers, polyamides, polyesters and celluloses.

What is known as flushing takes place in the treatment or production of pigments.

A solid-state post-condensation takes place in the production or treatment of polyesters and polyamides, a continuous slurrying for example in the treatment of fibers, for example cellulose fibers, with solvents, a crystallization from the melt or from solutions in the treatment of salts, fine chemicals, polyols, alcoholates, a compounding or mixing (continuously and/or batchwise) in the case of polymer mixtures, silicone compositions, sealing compositions or fly ash, and a coagulation (in particular continuously) in the treatment of polymer suspensions.

In a mixing kneader, multi-functional processes can also be combined, for example heating, drying, melting, crystallizing, mixing, degassing, reacting—all of these continuously or batchwise. Substances which are produced or treated by this means are polymers, elastomers, inorganic products, residues, pharmaceutical products, food products and printing inks.

In mixing kneaders, vacuum sublimation/desublimation can also take place, whereby chemical precursors, for example anthraquinone, metal chlorides, organometallic compounds etc. are purified. Furthermore, pharmaceutical intermediates can be produced.

A continuous carrier-gas desublimation takes place, for example, in the case of organic intermediates, for example anthraquinone and fine chemicals.

A distinction is substantially made between single-shaft and dual-shaft mixing kneaders. A single-shaft mixing kneader is described for example in EP 91 405 497.1. Multi-shaft mixing and kneading machines are described in CH-A 506 322, EP 0 517 068 B, DE 199 40 521 A1 or DE 101 60 535. In this machine, radial disk elements and axially oriented kneading bars arranged between the disks are located on a shaft. Mixing and kneading elements shaped in a frame-like manner engage between said disks from the other shaft. These mixing and kneading elements clean the disks and kneading bars of the first shaft. The kneading bars on both shafts in turn clean the inner wall of the housing.

U.S. Pat. No. 4,504,150 A discloses an extruder for kneading and extruding a synthetic material, a corresponding extruder screw being arranged rotatably in a cylindrical housing. Inserted between the screw flights are pins, with which the mass flow is to be monitored. In this case, a deformation of these pins is determined. Something similar is shown in DE 35 02 437 A1.

U.S. Pat. No. 4,508,454 A likewise shows an extruder, corresponding pins extending into recesses that are formed in the helix of the extruder screw. It is intended here to determine breakage of the pins, which may take place for example due to metal particles in the extrudate.

A mixing kneader of the type according to the invention is shown in DE 43 03 852 A1. In this document, the monitoring of kneading elements for breakage or similar damage is described. This may concern for example a small tube that is arranged in the kneading element and is pressurized or evacuated. In this case, this pressure or the vacuum is monitored.

The problem addressed by the present invention is that of making the operation of such a device according to the invention more reliable and trouble-free.

SUMMARY OF THE INVENTION

The problem is solved by a control signal with the aid of which the state of the kneading element can be clearly assigned being generated by the monitoring, with the control signal being generated from a drop in the pressure of the pressure medium and, when there is a drop in the pressure, pressure medium being supplied in order to maintain a predetermined pressure.

In the present case, the concept of the kneading element is to be understood in broad terms. It includes not only the hooks referred to as kneading counter-hooks, which are usually fixed in the housing, but also kneading elements that rotate with the shaft, even disk elements on which kneading bars are fixed. All of these elements are to be monitored, preferably individually, so that, for example if they are damaged, they can be exchanged, even individually. For this purpose, they should preferably be localized. It is sufficient if the monitored kneading element is connected to a monitoring device by way of a line or else wirelessly, so that the monitoring device also identifies the individual kneading element, which emits a corresponding signal.

Also no limit is to be set for the monitoring. In the present case, the monitoring relates especially to cracks in the kneading element. In the case of the forming of a crack, it can be assumed that the kneading element will break before long.

For the purpose of determining the forming of a crack, a corresponding kneading element is to be passed through at least partially by at least one channel, with a pressure medium located in the channel. Where the channel is arranged in the kneading element is of secondary importance. There may even be an entire network of channels that is under pressure. As soon as a crack forms, the pressure medium escapes through this crack and indicates that the formation of a crack has taken place. For this purpose, the channel is connected to a pressure medium source. A gas, and nitrogen in particular here, comes into consideration especially as the pressure medium. However, it may also be a liquid medium. This is also to be covered by the present invention.

According to the invention, the pressure medium toward the kneading element is monitored and, in particular, a distinction is made between a normal leakage and an event that requires action to be taken by a control, for example a breakage of a kneading element must lead to switching off of the mixing kneader. In the case of this exemplary embodiment, a through-flow sensor that determines the amount of pressure medium over time is included in the pressure medium line. The pressure gradient produced by a normal leakage is equalized by supplying further pressure medium. As soon as this supply exceeds a predetermined through-flow value within a predetermined unit of time however, this is an indication that there is possibly a breakage of the kneading element, or at least the forming of a crack. In this case, an alarm is then set off, or a corresponding control unit instigates switching off of the mixing kneader or influencing it in some other way. Also conceivable as actions are the switching off, switching on or influencing of feed and discharge elements for starting material or product into or out of the kneading space or else the switching on or switching off or other influencing of the heating of the heatable elements of the mixing kneader.

The present invention not only relates to a corresponding method for monitoring the kneading elements, but also to a device that operates with such kneading elements. These are especially what are referred to as the mixing kneaders.

BRIEF DESCRIPTION OF THE DRAWINGS

Further advantages, features and details of the invention emerge from the following description of preferred exemplary embodiments and on the basis of the drawing, in which:

FIG. 3 shows a representation of an exemplary embodiment of a monitoring device in the form of a block diagram.

DETAILED DESCRIPTION

Figure 1:
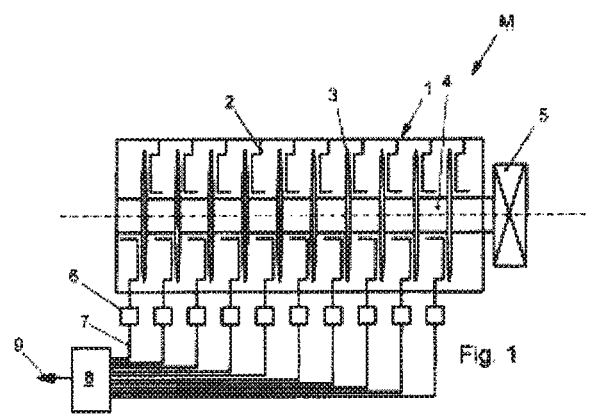
FIG. 1 shows a schematically represented plan view of a device according to the invention for treating viscous-pasty compositions.

Of a mixing kneader M, as shown more clearly for example in DE 43 03 852 A1, a housing 1 is represented in FIG. 1. In this housing 1 there are kneading elements 2, which are formed in a C-shaped manner. The kneading elements 2 interact with further disk-shaped kneading elements 3, which are arranged on a shaft 4. This shaft 4 is assigned a drive 5.

A valve block 6, which is connected to a monitoring device 8 by way of a line 7, is also respectively indicated for a row of kneading elements 2. This monitoring device 8 may, as indicated by the arrow 9, in turn be connected to a central control device.

Figure 2:
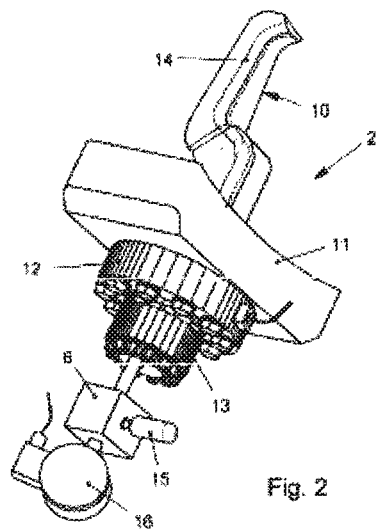
FIG. 2 shows a perspective view of a kneading element according to the invention with monitoring elements.

According to FIG. 2, the kneading element 2 consists substantially of a kneading body 10, which is mounted on a housing flange 11. It is also connected to a torque sensor 12, which is assigned a tensioning device 13.

In the kneading body 10 there is, indicated by dashed lines, at least one channel 14, which is in operative connection with the valve block 6 downstream of the tensioning device 13. This channel 14 may be subjected to a pressure medium by means of a pressure medium from a gas cylinder 15. The pressure in the channel 14 is monitored by way of a pressure measuring instrument 16, in particular a pressure gage.

The present invention functions as follows:

In the housing 1 there are preferably a plurality of kneading elements 2, as represented in FIG. 2. The kneading body 10 itself protrudes into the interior of the housing and is connected through the housing to the torque sensor 12, the tensioning device 13, the valve block 6 and the gas cylinder or pressure gage located outside the housing by means of the housing flange 11. A pressure is maintained in the channel 14 by way of the gas cylinder 15. In the case of damage to the kneading body 10, the compressed gas escapes through a possible crack into the interior of the housing, so that the pressure in the channel 14 is reduced. This is determined by the pressure gage 16, which emits a signal to the monitoring device 8. It is of course also possible here to fix a certain limit below which the pressure switch first responds. Moreover, the volume that is monitored should be chosen to be as small as possible, in order to ensure rapid, sensitive monitoring.

The kneading element 2 that is possibly damaged can thus be identified by way of the corresponding line 7. The damaged kneading element can then be removed and replaced by a dummy while the installation continues to operate. The mixing kneader continues to run quite normally, that is to say without stopping.

If a temperature sensor is also connected to the kneading body, the temperature, particularly in the composition to be treated, can be determined.

This temperature then serves for controlling the temperature of the treatment as specifically required.

It may also happen that there is an undesired misshaping of the kneading element, without the forming of a crack. According to the invention, it is provided here that the misshaping is determined by way of corresponding strain gages or else the torque sensor 12, and any damaged kneading element is exchanged.

A further idea of the invention, for which protection is also independently sought, concerns using these kneading elements, designed in this way, for feeding media that are intended to be used for the treatment of the viscous-pasty composition into the housing 1.

An exemplary embodiment of a monitoring device 8 according to the invention is shown in more detail in FIG. 3. Here, the kneading elements 2 are connected to a common valve block 17. For this purpose, a feed line 18 for a pressure medium is respectively provided. The valve block 17 is adjoined by a pressure medium line 19, in which a through-flow sensor 20 and a pressure reducer 21 are included toward the pressure source 15. The through-flow sensor 20 is connected to a central control unit 22, and similarly also a pressure sensor 23, which checks whether a pressure medium is present between the pressure reducer 21 and the through-flow sensor 20 in the pressure medium line 19.

It is not shown any more specifically in the drawing that the control unit is of course also connected to the pressure source connection 15 and the valve block 17 and any possibly present control valves or sensors for the kneading elements 2.

This monitoring device functions as follows:

A nitrogen gas at about 4 bars is applied to the pressure source 15 at the pressure reducer 21 by way of the pressure medium connection. The pressure reducer 21 has the effect of reducing the pressure, for example to 1 bar. The nitrogen flows through the pressure sensor 20 and the pressure medium line 19 into the valve block 17 and is distributed there to the individual kneading elements 2.

If a drop in pressure takes place, this may be attributable to a normal leakage or else to a breakage or the like of the kneading element. For the purpose of distinguishing between the two events and avoiding a false alarm, a predetermined, preferably constant pressure is always maintained in the pressure medium line 19, but the through flow is monitored, in particular with respect to the through-flow time. In the case of a normal leakage, a very small through flow takes place within a certain unit of time. An alarm is only set off if for example the through flow increases abruptly or strongly. This is an indication of a breakage or the forming of a crack in the kneading element, so that the alarm is then set off.

The corresponding control signal is then used for example for switching off the drive of the shaft of a mixing kneader or switching off, switching on or otherwise influencing feed and discharge elements for starting material or product into or out of a kneading space or else for switching off or influencing heating of the kneading space or of the kneading elements.

The invention claimed is:

1. A method for treating viscous-pasty compositions in a housing (1) with kneading elements (2, 3), at least one kneading element (2, 3) being monitored, comprising the steps of:
   generating a control signal with the aid of which the state of the kneading element can be clearly assigned by the monitoring, with the control signal being generated from a drop in the pressure of a pressure medium and, when there is a drop in pressure, pressure is supplied in order to maintain a predetermined pressure of the pressure medium and further comprising the steps of maintaining a predetermined constant pressure in the kneading element, and monitoring a through flow of the pressure medium to distinguish between normal leakage and breakage of the kneading element.

2. The method as claimed in claim 1, wherein a control signal is generated from the drop in the pressure of the pressure medium over time.

3. The method as claimed in claim 1, wherein a control signal is determined from a measurement of the through flow of pressure medium in a feed line to the kneading element (2, 3).

4. The method as claimed in claim 1, wherein the monitored kneading element (2, 3) is identified.

\* \* \* \* \*

UNITED STATES PATENT AND TRADEMARK OFFICE
CERTIFICATE OF CORRECTION

PATENT NO. : 10,442,113 B2  
APPLICATION NO. : 14/771333  
DATED : October 15, 2019  
INVENTOR(S) : Martin Althaus et al.

Page 1 of 1

It is certified that error appears in the above-identified patent and that said Letters Patent is hereby corrected as shown below:

On the Title Page

Item (73) The assignee should read --List Technology AG--.

Signed and Sealed this  
Twenty-fourth Day of November, 2020

Andrei Iancu  
*Director of the United States Patent and Trademark Office*